(12) United States Patent
Kessler (10) Patent No.: US 7,052,645 B2
(45) Date of Patent: May 30, 2006

(54) BLOW MOLDING APPARATUS AND METHOD

(75) Inventor: Robert H. Kessler, Chesterfield, MO (US)

(73) Assignee: Kessler Containers, Inc., St. Louis, MO (US)

( * ) Notice: Subject to any disclaimer, the term of this patent is extended or adjusted under 35 U.S.C. 154(b) by 253 days.

(21) Appl. No.: 10/672,646

(22) Filed: Sep. 26, 2003

(65) Prior Publication Data

US 2005/0067742 A1    Mar. 31, 2005

(51) Int. Cl.
*B29C 49/04* (2006.01)
*B29C 49/32* (2006.01)

(52) U.S. Cl. .................. 264/543; 425/532; 425/540

(58) Field of Classification Search ............... 425/532, 425/538, 539, 540; 264/542, 543; B29C 49/32
See application file for complete search history.

(56) References Cited

U.S. PATENT DOCUMENTS

| | | | |
|---|---|---|---|
| 3,327,035 A | | 6/1967 | Parfrey |
| 3,516,118 A | | 6/1970 | Gallay |
| 3,594,861 A | * | 7/1971 | Fischer et al. ............ 425/532 |
| 3,640,661 A | | 2/1972 | Gasior et al. |
| 3,738,788 A | | 6/1973 | Langecker |
| 3,743,466 A | * | 7/1973 | Gampe ................... 425/532 |
| 3,752,615 A | | 8/1973 | Van Manen |
| 3,767,747 A | | 10/1973 | Uhlig |
| 4,022,561 A | | 5/1977 | Strong |
| 4,372,910 A | | 2/1983 | Stroup et al. |
| 4,459,095 A | * | 7/1984 | Rohr et al. ................ 264/543 |
| 4,552,526 A | * | 11/1985 | Hafele ..................... 425/532 |
| 4,588,365 A | | 5/1986 | Holzschuh |
| 4,673,347 A | | 6/1987 | Ziegler |
| 4,801,260 A | | 1/1989 | Oles et al. |
| 5,209,889 A | | 5/1993 | Brown et al. |
| 5,320,511 A | | 6/1994 | Woerner |
| 5,601,773 A | | 2/1997 | Schmidt et al. |
| 5,643,620 A | | 7/1997 | Brun, Jr. |
| 5,695,792 A | * | 12/1997 | Carr ...................... 425/532 |
| 5,817,345 A | | 10/1998 | Koch et al. |
| 5,837,301 A | | 11/1998 | Arnott et al. |
| 6,196,829 B1 | | 3/2001 | Kagitani et al. |
| 6,499,988 B1 | | 12/2002 | Miura et al. |
| 2002/0086083 A1 | | 7/2002 | Singleton |
| 2002/0109271 A1 | | 8/2002 | Krall et al. |

FOREIGN PATENT DOCUMENTS

| | | | |
|---|---|---|---|
| DE | 19528751 A1 | * | 10/1996 |
| EP | 185110 A1 | * | 6/1986 |

* cited by examiner

OTHER PUBLICATIONS

International Search Report PCT/US04/30649.

*Primary Examiner*—Robert B. Davis
(74) *Attorney, Agent, or Firm*—Thompson Coburn LLP (57) ABSTRACT

A blow molding apparatus comprises a base, a blow molding extruder, a carriage, and first and second molding stations. The carriage is movably mounted to the base in a manner such that the carriage is movable along a non-linear path between first and second positions relative to the extruder and in a manner such that the carriage maintains a constant rotational orientation relative to the base as the carriage moves along the non-linear path. Each of the first and second molding stations is mounted to the carriage in a manner such that the first and second molding stations move with the carriage relative to the base as the carriage moves along the non-linear path.

19 Claims, 5 Drawing Sheets

BLOW MOLDING APPARATUS AND METHOD

BACKGROUND OF THE INVENTION

Various blow molding devices have been developed in an effort to increase the efficiency and production rate of fabricating blow molded articles. A common method of increasing the efficiency and production rate of a blow molding apparatus is to provide multiple blow molding stations for use in connection with a single parison extruder. Using such a method, parisons can be inserted into one mold cavity while blow molded articles are cooling in other mold cavities, thereby reducing the idle time of the extruder during production.

Different types of multiple blow molding station devices operate based on different primary principles. One method of operating a multiple blow molding station device is to provide multiple molding stations that revolve about an axis. Such devices are configured to perform different operations at various points along the rotational path traversed by the molding stations. An example of such a device is disclosed in U.S. Pat. No. 4,801,260, which is herein incorporated by reference in its entirety. These types of devices are advantageous in that they allow a single extruder to be used to extrude parisons into multiple molds and allow molded products to be discharged from each of the molds at a common stationary discharge or take-out station. However, there are also disadvantages associated with rotary multi-molding station devices. One such disadvantage is that the molding stations must revolve in order to proceed from one operational station to the next and therefore production must be completely stopped when performing routine service on any one of the molding stations.

Other types of multiple blow molding station devices utilize multiple molding stations that linearly reciprocate relative to an extruder. An example of such a reciprocating multiple molding station blow molding apparatus is disclosed in U.S. Pat. No. 6,499,988, which is hereby incorporated by reference in its entirety. While these reciprocating devices have advantages, they too have disadvantages. One such disadvantage of linear reciprocating devices is that they require relatively more bulky and higher maintenance drive mechanisms to move the molding stations than do the rotary type blow molding devices. Such drive mechanisms typically comprise hydraulic or pneumatic fluid actuators of sufficient length so as to be extendable by an amount equal to the distance that mold stations travel when reciprocating. Another disadvantage is that fluid supply lines for providing air, hydraulic fluid, water, or other fluids to the movable molding stations from non-movable portions of such devices must be flexible to accommodate the linear reciprocation. Invariably, such flexible fluid conduits fatigue, and thereby require maintenance throughout the useful operational life of the molding device.

In view of the foregoing, it should be appreciated that numerous developments have been made regarding multiple blow molding station devices. However, it should also be appreciated that improvements over existing multiple blow molding station devices can be made.

SUMMARY OF THE INVENTION

The present invention pertains to a multiple blow molding station device wherein the molding stations reciprocate along a non-linear path in relation to a parison extruder head. Unlike existing rotary molding station devices, a blow molding apparatus in accordance with the invention can be operated with its molding stations maintained in a stationary position using one molding station while another molding station is being serviced. Moreover, in the preferred embodiment of the invention, the molding stations reciprocate along the non-linear path using a simplified drive mechanism that does not require a stroke length equal to distance traversed by the molding stations as the molding stations are reciprocated. Yet further, the non-linear reciprocation of the molding stations associated with the preferred embodiment of the device allows for the use of rigid fluid conduits to provide fluid transfer between the reciprocating molding stations and a remaining portion of the device. Although the preferred embodiment of the invention achieves all of these advantages, alternative embodiments of the invention need not necessarily achieve each and every advantage.

In a first aspect of the invention, an apparatus comprises a base, a blow molding extruder, a carriage, and first and second molding stations. The blow molding extruder is mounted to the base and has a head that is configured and adapted to extrude parisons. The carriage is movably mounted to the base in a manner such that the carriage is movable along a non-linear path between first and second positions relative to the extruder and in a manner such that the carriage maintains a constant rotational orientation relative to the base as the carriage moves along the non-linear path. The first and second molding stations each comprise at least two mold components that together form a blow mold. Each of the first and second molding stations is mounted to the carriage in a manner such that the first and second molding stations move with the carriage relative to the base as the carriage moves along the non-linear path. The first molding station is positionable beneath the head of the extruder when the carriage is in the first position and the second molding station is positionable beneath the head of the extruder when the carriage is in the second position.

In a second aspect of the invention, a method comprises providing a blow molding apparatus. The blow molding apparatus has a base, a blow molding extruder, a carriage, and first and second molding stations. The blow molding extruder is mounted to the base and has a head that is configured and adapted to extrude parisons. The carriage is movably mounted to the base. Each of the first and second molding stations comprises at least two mold components that together form a blow mold. The method further comprises inserting a parison from the head of the blow molding extruder into the blow mold of the first molding station with the carriage positioned in a first position relative to the base. Additionally, the method comprises moving the carriage in non-linear manner relative to the base from the first position to a second position while maintaining a constant rotational orientation between the carriage and the base. Yet further, the method comprises inserting a parison from the head of the blow molding extruder into the blow mold of the second molding station with the carriage positioned in the second position relative to the base.

In a third aspect of the invention, a method comprises providing a blow molding apparatus. The blow molding apparatus has a base, a blow molding extruder, a molding station, and a connecting member. The blow molding extruder is mounted to the base and has a head that is configured and adapted to extrude parisons. The molding station comprises at least two mold components that together form a blow mold. The connecting member is pivotally connected to the molding station and to the base about first and second pivot axes respectively. The method further comprises inserting a parison from the head of the blow molding extruder into the blow mold of the molding station with the molding station positioned in a first position relative to the base. Yet further, the method comprises moving the molding station from the first position by simultaneously pivoting the connecting member relative to the base and relative to the molding station.

While the principal advantages and features of the invention have been described above, a more complete and thorough understanding of the invention may be obtained by referring to the drawings and the detailed description of the preferred embodiment which follow.

Reference characters in the written specification indicate corresponding items shown throughout the drawing figures.

DETAILED DESCRIPTION OF THE PREFERRED EMBODIMENTS OF THE INVENTION

The preferred embodiment of a blow molding apparatus in accordance with the invention is shown in FIGS. 1–4. In general, the preferred embodiment of the blow molding apparatus 20 comprises a base 22, an extruder 24, a carriage 26, first and second molding stations 28, 30, and a linking assembly 32.

The base 22 of the blow molding apparatus 20 provides structure for connecting the various other components of the apparatus to each other and is preferably formed of welded steel plate and steel tubing. The base 22 supports the extruder 24 in manner such that the extruder is partially cantilevered over the carriage 26. As shown, the base 22 also comprises two sets of parallel beams 34 that are positioned generally beneath the carriage 26 and that are utilized to support the carriage. Although not shown, the base 22 also comprises cladding to prevent operators from being injured by moving components of the apparatus during use and is provided with an electronic control device for controlling the apparatus.

The extruder 24 of the blow molding apparatus is preferably a conventional extruder of the type commonly utilized in connection blow molding apparatus. The extruder 24 comprises a head 36 that is configured and adapted to extrude parisons downward therefrom can be a single or multiple extrusion head device and is preferably a dual extrusion head device as shown. As is clearly shown in FIG. 4, the extruder 24 is preferably pivotally connected to the base 22 about a horizontal axis 37 in a manner such that the head 36 of the extruder, which is generally cantilevered above the carriage 26, can be raised and lowered slightly, but such that the extruder is otherwise fixed in relation to the base. The pivotal movement of the extruder 24 allows for continues extrusion during production. The extruder 24 preferably operates in a conventional manner and, as such, a detailed discussion of the operation of the extruder is not herein provided.

The carriage 26 of the blow molding apparatus 20 provides structure for supporting the molding stations 28, 30 and, like the base 22, is preferably formed primarily of welded steel tubing. The weight of the carriage 26 and the components that it supports is borne by the beams 34 of the base 22 of the blow molding apparatus 20 via a pair of intermediate members 38. The intermediate members 38 comprise rigid steel plates that are mounted to the beams 34 of the base 22 by bearings in a manner such that the intermediate members can horizontally slide along the longitudinal axes of the beams. Because the blow molding apparatus 20 is configured such that the carriage reciprocates along a non-linear path (shown generally by the phantom lines in the figures), additional bearings between the carriage 26 and the intermediate members 38 are provided to allow the carriage to horizontally slide relative to the intermediate members, perpendicular to the longitudinal direction of the beams 34. As mentioned above, the carriage 26 supports other components of the blow molding apparatus 20. Most significantly, the first and second molding stations 28,30 are mounted to the carriage 26 for movement therewith relative to the base 22 and relative to the extruder 24 of the blow molding apparatus 20. Additionally, first and second blow stations 40,42 are mounted to and supported by the carriage 26 for movement therewith. The blow stations 40,42 are supported by the structure of the carriage 26 above the molding stations 28,30.

Figure 1:
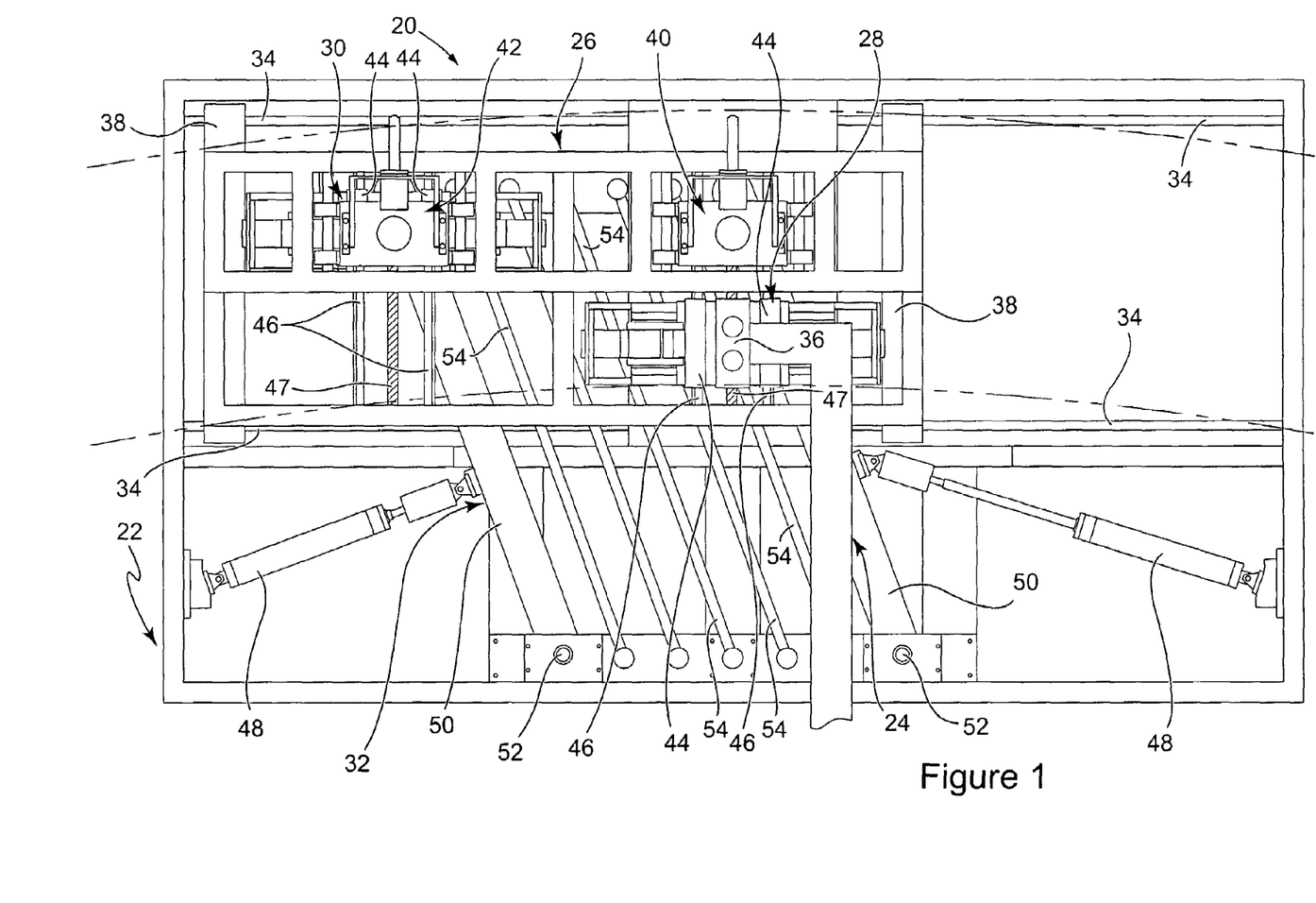
FIG. 1 is a plan view of the preferred embodiment of a multiple molding station blow molding apparatus in accordance with the invention and is shown with its carriage in a first position relative to the extruder head of the molding apparatus.
Figure 3:
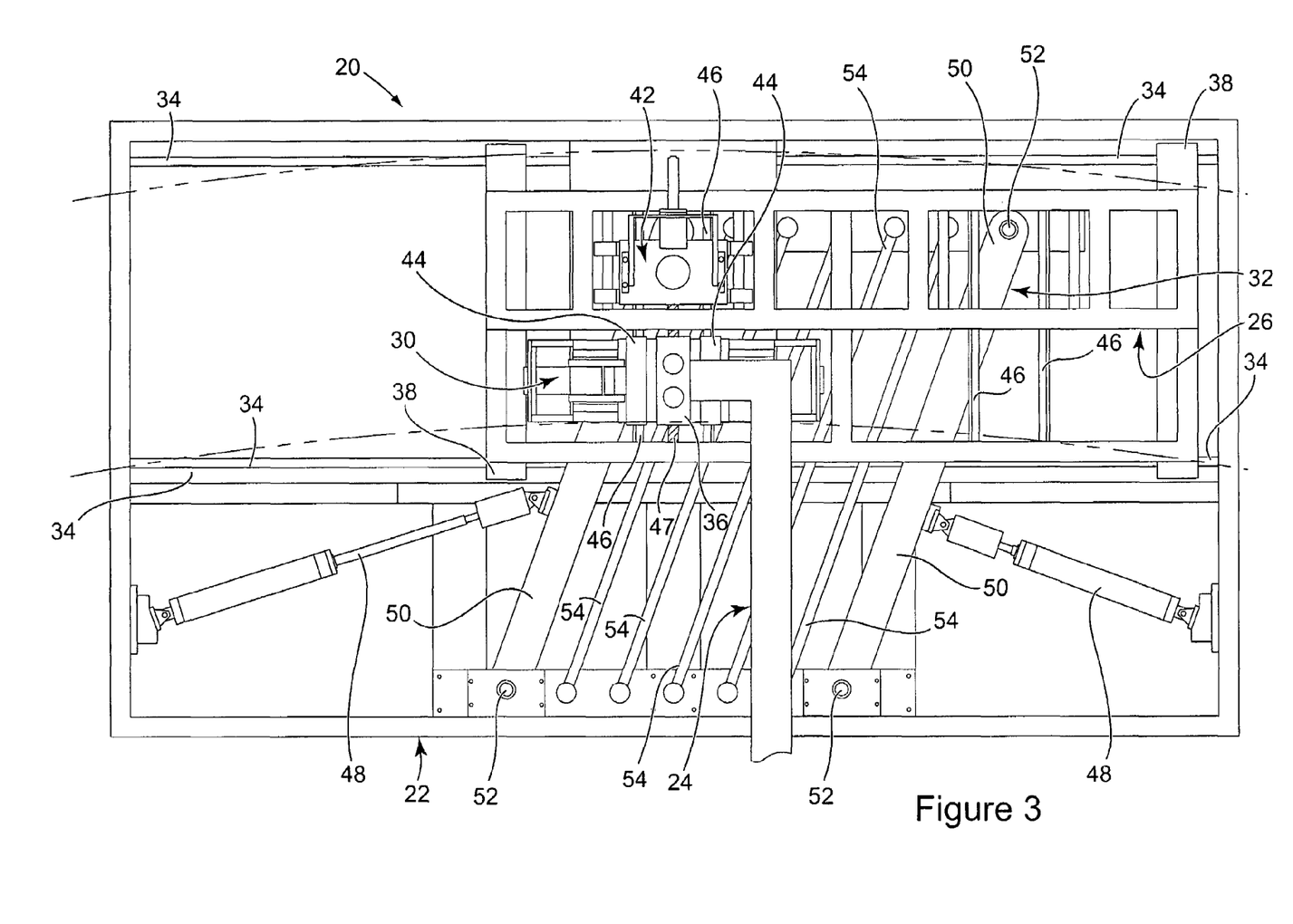
FIG. 3 is a plan view of the apparatus shown in FIGS. 1 and 2 and is shown with the carriage in the second position, one of the molding stations of the apparatus and its corresponding blow station are not shown in this figure so as to further clarify other aspects of the apparatus.
Figure 4:
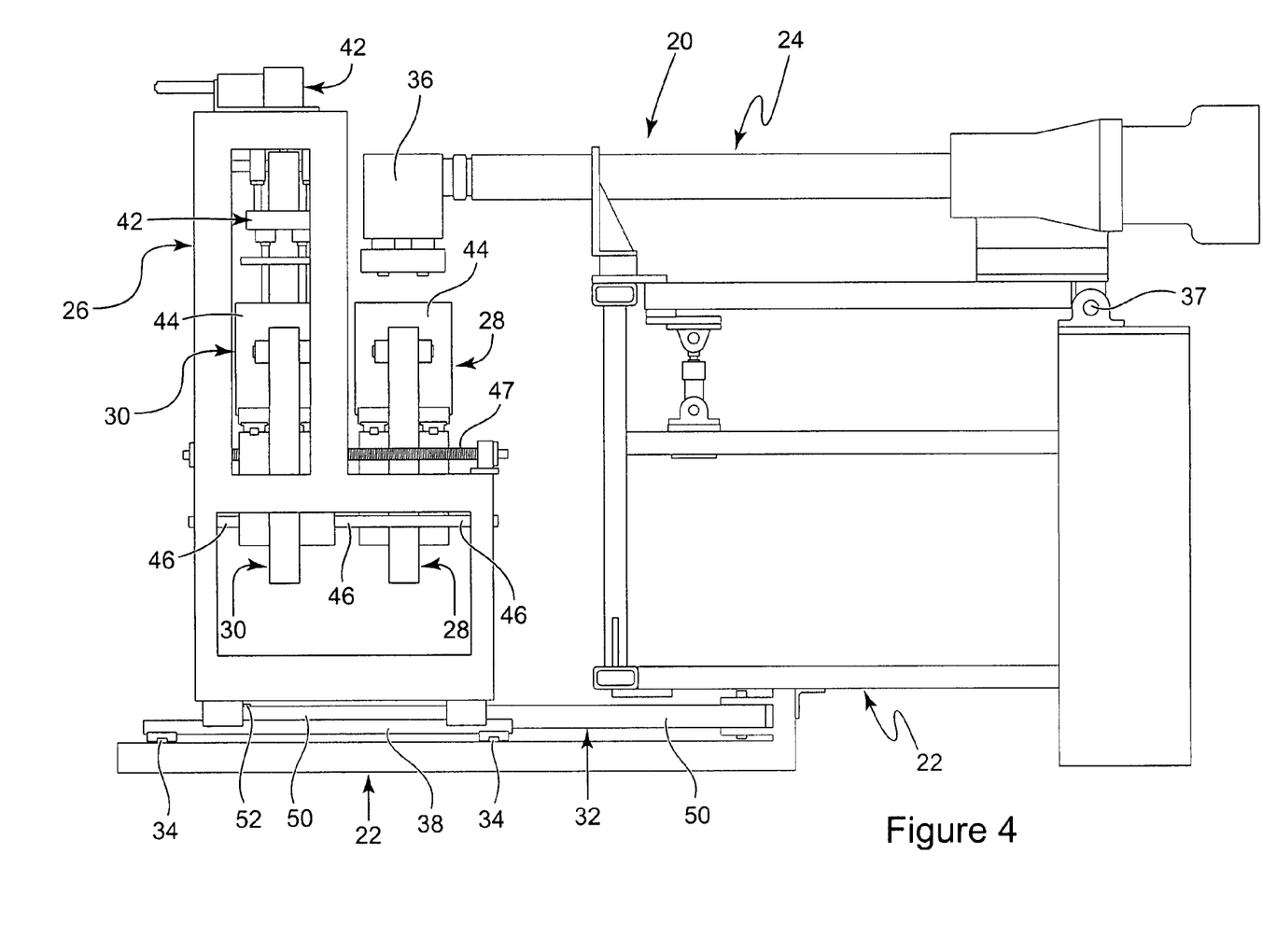
FIG. 4 is an elevation view of the apparatus shown in FIGS. 1–3 and is shown with the carriage in the first position.
Figure 5:
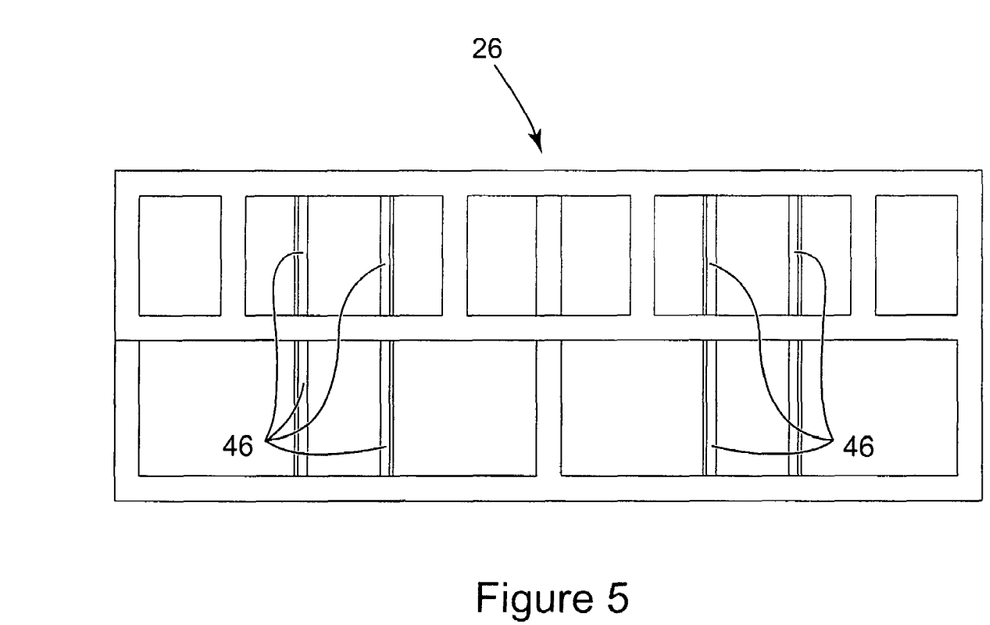
FIG. 5 is a plan view of the of the carriage of the apparatus shown in FIGS. 1–4 shown by itself.
Figure 6:
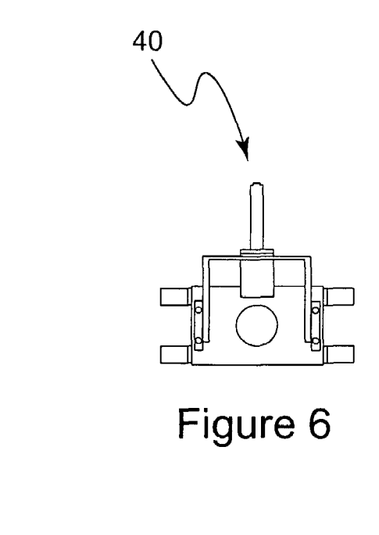
FIG. 6 is a plan view of a blow station of the apparatus shown in FIGS. 1–4 shown by itself.
Figure 7:
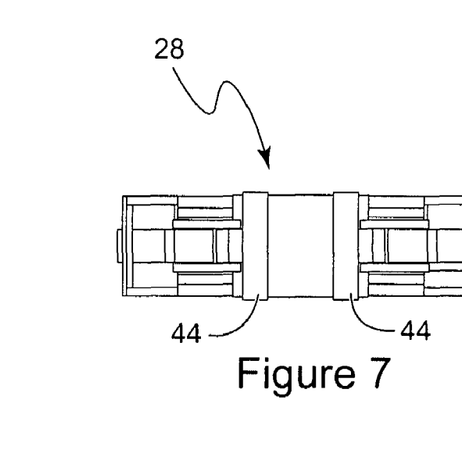
FIG. 7 is a plan view of a molding station of the apparatus shown in FIGS. 1–4 shown by itself.

The first and second molding stations 28,30 each preferably comprise at least two mold components 44 that are movable relative to each other and that together form a blow mold. The molding station 28, 30 are preferably identical to each other and the first molding station 28, for clarity, is shown by itself in FIG. 6. The particular configuration of such molding stations are well known in the relevant art and various types of such molding stations can be utilized in connection with the invention. Nonetheless, regardless of the particular configuration of the first and second molding stations 28,30, it should be appreciated that each comprises a device for moving the mold components 44 in a manner such that the mold components can be clamped to each other and, alternatively, separated from each other. The molding stations 28,30 are preferably oriented relative to the carriage 26 in a manner such that the molding components 44 move toward and apart from each other in a direction generally parallel to the longitudinal axes of the beams 34 of the base 22 of the blow molding apparatus 20. Each of the molding stations 28,30 is also movably mounted to the carriage 26 upon rails 46 in a manner such that the molding station is movable in a direction generally perpendicular to the axes of the beams 34 of the base 22 relative to the carriage. Such movement of the blow molding stations 28,30 is preferably controllable by a pair of independent linear actuators 47. In FIGS. 1 and 4, the first molding station 28 is shown in a position beneath the head 36 of the extruder 24 and the second molding station 30 is shown in a position beneath the second blow station 42. In FIG. 3, the second molding station 30 is shown in a position beneath the head 36 of the extruder 24.

The linking assembly 32 of the blow molding apparatus 20 further connects the carriage 26 to the base 22 and drives the non-linear relative movement therebetween. The linking assembly 32 preferably comprises a pair of fluid (gas or liquid) actuated pistons 48 and a pair of connecting members 50. The connecting members form parallel linkages and each have a pair of spaced apart pivot connections 52. Each connecting member 50 is pivotally connected to the carriage 26 by one of its pivot connections 52 (seen most clearly in FIG. 3) and is pivotally connected to the base 22 by the other of its pivot connections. Thus, the connecting members 50 secure the carriage 26 to the base 22 in a manner allowing the carriage to move horizontally only along a fixed non-linear path relative to the base and in a manner preventing the carriage from changing its rotational orientation relative to the base.

The pistons 48 of the linking assembly 32 control the movement of the carriage 26 relative to the base 22. Each of the pistons 48 is adjustable between extended and retracted positions by fluid actuation and each is pivotally connected to the base 22 of the blow molding apparatus 20. Additionally, one of the pistons 48 is pivotally connected to one of the connecting members 50 and the other of the pistons is pivotally connected to the other of the connecting members. As configured, the simultaneous extension of one of the pistons 48 coupled with the retraction of the other of the pistons causes the connecting members 50 to pivot about their pivot connections 52 relative to the base 22 and thereby causes the carriage 26 to move relative to the base.

The linking assembly 32 also preferably comprises a plurality of fluid conduits 54 that allow fluid to pass between the carriage 26 and the base 22 of the blow molding apparatus 20. The fluid conduits 54 are preferably formed of rigid metal tubing and each is pivotally connected at one of its ends to the carriage 26 and at its other end to the base 22. It should be appreciated that by aligning the fluid conduits 54 parallel to the connecting members 50 and by positioning the pivot points of the fluid conduits in-line with the pivot connections 52 of the connecting members, the fluid conduits are able to pivot relative to the carriage 26 and the base 22 in response to the movement of the carriage relative to the base. The fluid conduits thereby allow fluids such as hydraulic fluid, pressurized air, and/or water or other cooling fluids, to pass between the carriage and the base without requiring flexible fluid hoses. This eliminates the need to periodically replace the fluid conduits 54, as would otherwise be the case if flexible fluid conduits were utilized. However, it should be appreciated that at least some maintenance, such as replacement of O-ring seals at the pivot points of the fluid conducts, may be required.

In its fully operative mode, the blow molding apparatus 20 operates in a manner such that the carriage 26 moves back and forth between a first position as shown in FIG. 1 and a second position as shown in FIG. 3 relative to the base 22. In the first position, the carriage 26 is positioned relative to the base 22 in a manner such that the head 36 of the extruder 24 lies between the pair of rails 46 of the carriage that support the first molding station 28. In this position, the first molding station 28 can be moved along the rails 46 that support it by its linear actuator 47 such that the first molding station is positioned beneath the head 36 of the extruder 24, as shown in FIG. 1. With the first molding station 28 so positioned, the mold components 44 of the first molding station are clamped together around a parison that has been extruded from the extruder 24. The first molding station 28 is then moved along the rails 46 relative to the carriage to a position where the first molding station is beneath the first blow station 40, where the parison is then blow molded to conform to the mold of the first molding station. This movement of the first molding station 28 along the rails 46 may occur while the carriage 26 is stopped in the first position relative to the base 22, or may occur at least partially during the movement of the carriage from the first position to the second position as explained below.

Figure 2:
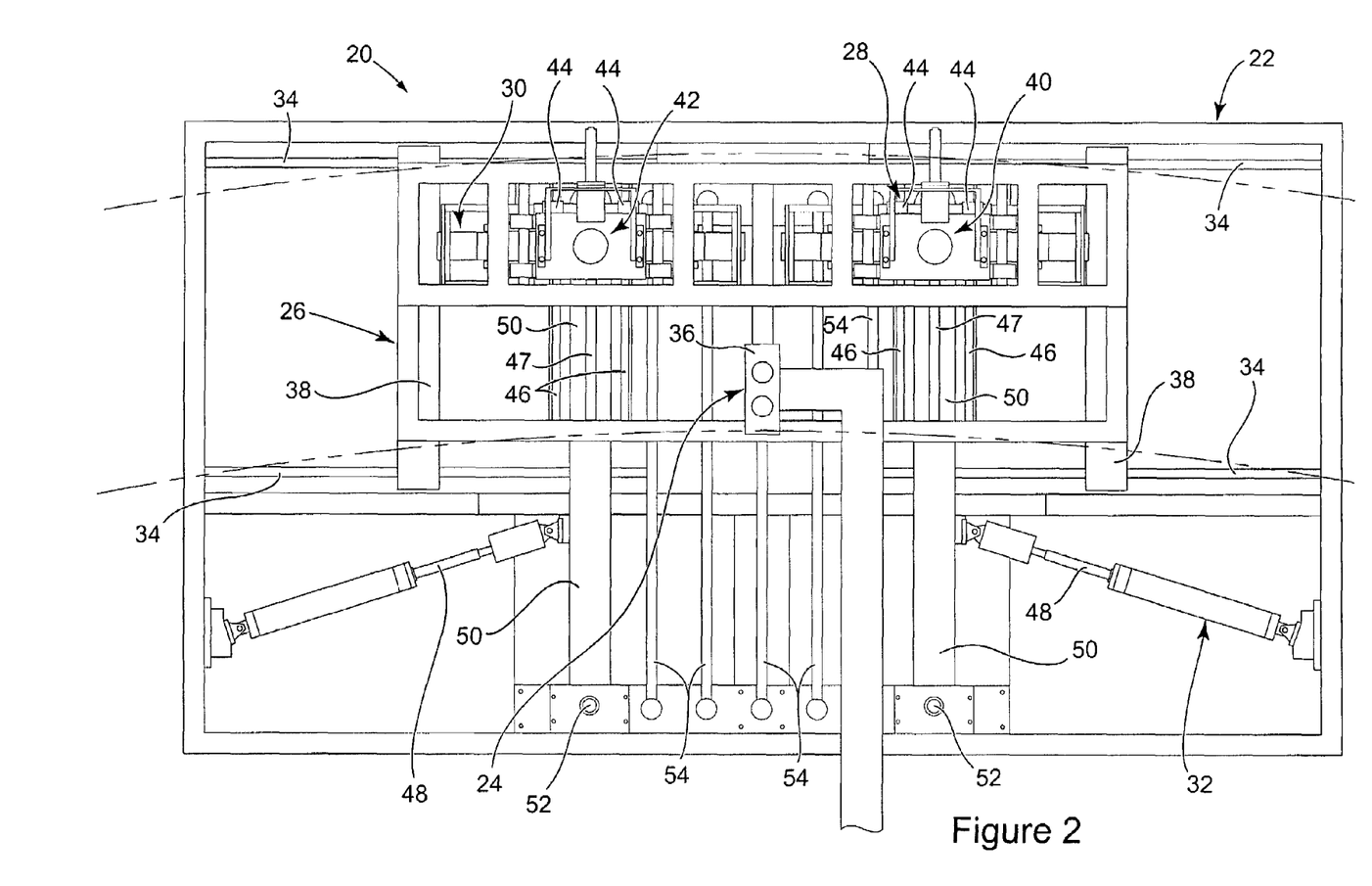
FIG. 2 is a plan view of the apparatus shown in FIG. 1 and is shown with the carriage in an intermediate position between the first position and a second position.

Preferably shortly after the first molding station 28 receives the parison and begins to move to a position beneath the first blow station 40, the pistons 48 of the linking assembly 32 are activated to move the carriage 26. As the leftmost piston 48 shown in the Figures extends and the other piston retracts, the pistons cause the connecting members 50 to pivot about their pivot connections 52 relative to the base 22. Such pivotal movement causes the carriage 26 to swing relative to the base 22 from the first position shown in FIG. 1 to the second position shown in FIG. 3, during which it passes through an intermediate position as shown in FIG. 2. As the carriage 26 moves from the first position to the second position, the intermediate members 38 of the blow mold apparatus 20 slide along the longitudinally axes of the beams 34 of the base 22 while, simultaneously, the carriage 26 slides perpendicularly thereto on the intermediate members 38.

When in the second position shown in FIG. 3, the carriage 26 is positioned relative to the base 22 in a manner such that the head 36 of the extruder 24 is positioned between the rails 46 of the carriage that support the second molding station 30. In this position, the second molding station 30 can be moved along the rails 46 that support it such that the second molding station is positioned beneath the head 36 of the extruder 24, as shown in FIG. 3. However, this movement can occur while the carriage is in motion. Regardless, with the second molding station 30 so positioned, the mold components 44 of the second molding station are clamped together around a parison that has been extruded from the extruder 24. The second molding station 30 is then moved along the rails 46 relative to the carriage to a position where it is beneath the second blow station 42, where the parison is then blow molded to conform to the mold of the second molding station.

Preferably shortly after the second molding station 30 receives the parison and while the second molding station moves to a position beneath the second blow station 42, the pistons 48 of the linking assembly 32 are again activated to move the carriage 26. This time the rightmost piston 48 shown in the Figures extends and the other piston retracts to move the carriage 26 back to its first position relative to the base 22.

The above mentioned steps are repeated during full operation of the blow molding apparatus 20. During this operation, blown parisons in the mold of the first molding station 28 cool while the carriage 36 is positioned in the second position and the second mold station is receiving a new parison, and vice versa. Upon the carriage's return to the first position, and prior to the insertion of a new parison therein, the mold components of the first molding station 28 are separated and a take-out device (not shown) is activated to remove the cooled blow molded object therefrom. The take-out device, which is preferably a conventional take-out device of the type well known in the art of molding, is preferably positioned in-line with the head 36 of the extruder 24 and the first blow station 40 when the carriage 26 is in the position shown in FIG. 1 and in a manner such that the first blow station lies between the head of the extruder and the take-out device. As such, the take-out device is also automatically in-line with the head 36 of the extruder 24 and the second blow station 42 when the carriage 26 is in the position shown in FIG. 3. Thus, upon the carriage's return to the second position, and prior to the insertion of a new parison therein, the mold components of the second molding station 30 are separated and the same take-out device is activated to remove the cooled blow molded object therefrom. This allows for all finished blow molded products to be removed from the blow molding apparatus 20 via a single take-out device and carried away therefrom via a single conveyer path.

As the carriage 26 moves back and forth along the non-linear path, the fluid conduits 54 pivot in unison with the connecting members 50 of the linking assembly 32. Thus, hydraulic fluid, compressed air, and cooling fluid can be continuously transferred between the base 22 of the blow molding apparatus 20 and the carriage 26. Such fluids can be utilized to drive the various mechanisms, such as the clamping of the mold components 44, and can also be utilized to cool the molding components and to blow mold the parisons. Thus, it should be appreciated that the carriage 26 can be supplied with fluids while moving, without the need for flexible hoses or the like.

If service of one of the molding stations 28,30 is required or desired, for example when changing a mold, the movement of the carriage 26 can be halted with the carriage in either its first or second position relative to the base 22. This allows the blow molding apparatus 20 to continue production via the molding station that is positioned adjacent the head of the extruder while the other molding station is being serviced, albeit at a reduced production rate.

It should be appreciated that the operation of the blow molding apparatus, be it in full production or partial production with the carriage halted as discussed above, is preferably automated via an electronic control device. Additionally, it should be appreciated that various steps of the production may occur simultaneously. For example, the molding stations may be moved to their positions beneath the blow stations and the blowing steps performed while the carriage is being moved between its first and second positions. Additionally, the sequence and timing of the production steps can be varied to accommodate various cooling time periods needed between the blow molding of parisons and their subsequent removal from the molding stations via the take-out device.

While the present invention has been described in reference to a specific embodiment, in light of the foregoing, it should be understood that all matter contained in the above description or shown in the accompanying drawings is intended to be interpreted as illustrative and not in a limiting sense and that various modifications and variations of the invention may be constructed without departing from the scope of the invention defined by the following claims. For example, it should be appreciated that the molding stations could each comprise multiple mold cavities and the extruder could be configured to extrude multiple parisons simultaneously. Additionally, the rails of the base and the intermediate members that support the weight of the carriage could be replaced with curvilinear rails that would allow the same non-linear movement of the carriage. Furthermore, it should be appreciated that electric, pneumatic, hydraulic, or any other types of drive mechanisms and actuators could be utilized in place of those utilized in connection with the blow molding apparatus of the preferred embodiment. Yet further, it should be appreciated that the molding stations need not necessarily be movable relative to the carriage. Thus, other possible variations and modifications should be appreciated.

Furthermore, it should be understood that when introducing elements of the present invention in the claims or in the above description of the preferred embodiment of the invention, the terms "comprising," "including," and "having" are intended to be open-ended and mean that there may be additional elements other than the listed elements.

What is claimed is:

1. An apparatus comprising:
   a base;
   a blow molding extruder mounted to the base, the extruder having a head that is configured and adapted to extrude parisons therefrom;
   a carriage, the carriage being movably mounted to the base in a manner such that the carriage is movable along a non-linear path between first and second positions relative to the extruder and in a manner such that the carriage maintains a constant rotational orientation relative to the base as the carriage moves along the non-linear path; and
   first and second molding stations, each of the first and second molding stations comprising at least two mold components that together form a blow mold, each of the first and second molding stations being mounted to the carriage in a manner such that the first and second molding stations move with the carriage relative to the base as the carriage moves along the non-linear path between the first and second positions, the first molding station being positionable beneath the head of the extruder when the carriage is in the first position, the second molding station being positionable beneath the head of the extruder when the carriage is in the second position.

2. An apparatus in accordance with claim 1 wherein the first and second molding stations are each movably connected to the carriage.

3. An apparatus in accordance with claim 1 further comprising first and second connecting members, each of the first and second connecting members having first and second pivot connections and a longitudinal length separating the first and second pivot connections, the longitudinal length of the first connecting member being equal to the longitudinal length of the second connecting member, the first pivot connection of each of the first and second connecting members pivotally connecting the respective connecting member to the carriage about a respective carriage axis, the second pivot connection of each of the first and second connecting members pivotally connecting the respective connecting member to the base about a respective base axis, the carriage axes being spaced from each other by a distance, the base axes being spaced from each other by the distance.

4. An apparatus in accordance with claim 3 further comprising a rigid fluid conduit operatively connected to the base and to the carriage, the fluid conduit having first and second pivot connections and a longitudinal length separating the first and second pivot connections, the first pivot connection of the fluid conduit pivotally connecting the fluid conduit to the carriage about a carriage axis, the second pivot connection of the fluid conduit pivotally connecting the fluid conduit to the base about a base axis, the longitudinal length of the fluid conduit being equal to the longitudinal length of the first connecting member, the carriage axis about which the fluid conduit is pivotally connected being in-line with the carriage axes about which the first and second connecting members are pivotally connected, the base axis about which the fluid conduit is pivotally connected being in-line with the base axes about which the first and second connecting members are pivotally connected.

5. An apparatus in accordance with claim 3 further comprising a fluid actuated piston, the piston being movable between extended and retracted positions, the piston being pivotally connected to the base and to at least one the first and second connecting members in a manner such that movement of the piston between retracted and extended positions causes movement of the carriage along the non-linear path relative to the extruder.

6. An apparatus in accordance with claim 5 wherein the piston constitutes a first piston and wherein the apparatus further comprises a second fluid actuated piston, the second piston being movable between extended and retracted positions, the second piston being pivotally connected to the base and to at least one of the first and second connecting members in a manner such that movement of the second piston between retracted and extended positions causes movement of the carriage along the non-linear path relative to the extruder, the second piston being configured to move from its extended position to its retracted position as the first piston moves from its retracted position to its extended position and vice versa.

7. An apparatus in accordance with claim 3 wherein the first and second molding stations are each movably connected to the carriage.

8. A method comprising:
providing a blow molding apparatus, the blow molding apparatus having a base, a blow molding extruder, a carriage, and first and second molding stations, the blow molding extruder being mounted to the base and having a head that is configured and adapted to extrude parisons therefrom, the carriage being movably mounted to the base, each of the first and second molding stations comprising at least two mold components that together form a blow mold;
inserting a parison from the head of the blow molding extruder into the blow mold of the first molding station with the carriage positioned in a first position relative to the base;
moving the carriage in non-linear manner relative to the base from the first position to a second position while maintaining a constant rotational orientation between the carriage and the base; and
inserting a parison from the head of the blow molding extruder into the blow mold of the second molding station with the carriage positioned in the second position relative to the base.

9. A method in accordance with claim 8 wherein the step of providing the blow molding apparatus occurs in a manner such that the first and second molding stations are each movable relative to the carriage, and wherein the method further comprises moving the first and second molding stations relative to the carriage.

10. A method in accordance with claim 8 wherein the step of providing the blow molding apparatus occurs in a manner such that the blow molding apparatus comprises first and second connecting members, each of the first and second connecting members being pivotally connected to the carriage and to the base in a manner defining four parallel and spaced apart axes, and wherein the step of moving the carriage in non-linear manner relative to the base from the first position to a second position occurs by pivoting each of the first and second connecting members relative to the carriage while simultaneously pivoting each of the first and second connecting members relative to the base.

11. A method in accordance with claim 10 wherein the step of providing the blow molding apparatus occurs in a manner such that the blow molding apparatus comprises a fluid actuated piston, the piston being movable between extended and retracted positions, the piston being pivotally connected to the base and to at least one the first and second connecting members, and wherein the step of moving the carriage relative to the base from the first position to the second position occurs in response to movement of the piston between its retracted and extended positions.

12. A method in accordance with claim 11 wherein the piston constitutes a first piston and the step of providing the blow molding apparatus occurs in a manner such that the blow molding apparatus comprises a second fluid actuated piston, the second piston being movable between extended and retracted positions, and wherein the step of moving the carriage relative to the base from the first position to the second position comprises moving the second piston between its retracted and extended positions, the second piston moving from its extended position to its retracted position as the first piston moves from its retracted position to its extended position.

13. A method in accordance with claim 8 wherein the step of providing the blow molding apparatus occurs in a manner such that the blow molding apparatus comprises a rigid fluid conduit, the fluid conduit being operatively connected to the base in a manner such that the fluid conduit can pivot relative to the base, the fluid conduit also being operatively connected to the carriage in a manner such that the fluid conduit can pivot relative to the carriage, and wherein the step of moving the carriage in non-linear manner relative to the base from the first position to the second position causes the fluid conduit to pivot relative to the carriage and the base, the method further comprising providing fluid communication between the base and the carriage via the fluid conduit.

14. A method comprising:
providing a blow molding apparatus, the blow molding apparatus having a base, a blow molding extruder, a first molding station, a second molding station, and a connecting member, the, blow molding extruder being mounted to the base and having a head that is configured and adapted to extrude parisons therefrom, the first molding station and the second molding station each comprising at least two mold components that together form a blow mold, the connecting member being pivotally connected to the first molding station and the second molding station about a first pivot axis and being pivotally connected to the base about a second pivot axis;
inserting a parison from the head of the blow molding extruder into the blow mold of the first molding station with the first and second molding stations positioned in a first position relative to the base;
moving the first and second molding stations from the first position to a second position relative to the base by simultaneously pivoting the connecting member relative to the base and relative to the first and second molding stations; and
inserting a parison from the head of the blow molding extruder into the blow mold of the second molding station with the first and second molding stations positioned in the second position.

15. A method in accordance with claim 14 wherein the step of providing the blow molding apparatus occurs in a manner such that the blow molding apparatus comprises a carriage, the carriage pivotally connecting the first and second molding stations to the connecting member, and wherein the step of moving the first molding station from the first position comprises pivotally moving the carriage relative to the connecting member about the first axis.

16. A method in accordance with claim 15 wherein the step of providing the blow molding apparatus occurs in a manner such that the first and second molding stations are each movable relative to the carriage, and wherein the method further comprises moving the first and second molding stations relative to the carriage.

17. A method comprising:
providing a blow molding apparatus, the blow molding apparatus having a base. a blow molding extruder, a molding station, a rigid fluid conduit, and first and second connecting members, the blow molding extruder being mounted to the base and having a head that is configured and adapted to extrude parisons therefrom, the molding station comprising at least two mold components that together form a blow mold, the first connecting member being pivotally connected to the molding station and to the base about first and second pivot axes respectively, the second connecting member being pivotally connected to the molding station and to the base about third and fourth pivot axes respectively, the first, second, third, and fourth pivot axes defining a first plane that includes the first and third axes and a parallel second plane that includes the second and fourth axes, the fluid conduit being pivotally connected to the molding station about a fifth pivot axis and being pivotally connected to the base about a sixth pivot axis, the first plane including the fifth pivot axis, the second plane including the sixth pivot axis;

inserting a parison from the head of the blow molding extruder into the blow mold of the molding station with the molding station positioned in a first position relative to the base;

moving the molding station from the first position by simultaneously pivoting the first and second connecting members and the fluid conduit relative to the base and relative to the molding station while maintaining the first and second planes parallel to each other; and providing fluid communication between the base and the molding station via the fluid conduit.

18. A method in accordance with claim 17 wherein the step of providing the blow molding apparatus occurs in a manner such that the blow molding apparatus comprises a fluid actuated piston, the piston being movable between extended and retracted positions, the piston being pivotally connected to the base and to at least-one least one of the first and second connecting members, and wherein the step of moving the molding station from the first position occurs in response to movement of the piston between its retracted and extended positions.

19. A method in accordance with claim 14 wherein the step of providing the blow molding apparatus occurs in a manner such that the blow molding apparatus comprises a fluid actuated piston, the piston being movable between extended and retracted positions, the piston being pivotally connected to the base and to the connecting member, and wherein the step of moving the molding station from the first position occurs in response to movement of the piston between its retracted and extended positions.

* * * * *